United States Patent [19]

Comerford et al.

[11] Patent Number: 4,992,935
[45] Date of Patent: Feb. 12, 1991

[54] BIT MAP SEARCH BY COMPETITIVE PROCESSORS

[75] Inventors: Liam D. Comerford, Carmel; Barry C. Goldstein, Chappaqua, both of N.Y.

[73] Assignee: International Business Machines Corporation, Armonk, N.Y.

[21] Appl. No.: 218,174

[22] Filed: Jul. 12, 1988

[51] Int. Cl.⁵ ............................................. G06F 12/06
[52] U.S. Cl. ................................. 364/200; 364/245.5; 364/246; 364/254.3
[58] Field of Search ............................. 364/200, 900

[56] References Cited

U.S. PATENT DOCUMENTS 4,403,283 9/1983 Myntti et al. ..................... 364/200
4,686,620 8/1987 Ng ..................................... 364/200
4,761,737 8/1988 Duvall et al. ..................... 364/200

Primary Examiner—Michael R. Fleming
Assistant Examiner—Debra A. Chun
Attorney, Agent, or Firm—Jack M. Arnold

[57] ABSTRACT

A method and apparatus for performing a bit map search of the allocation state of memory pages in a computing system. A competitive search is accomplished by a pair of dedicated microprocessors, each of which implements a differently optimized search procedure, to find a bit indicating an un-allocated page in the memory. The first processor to find such a bit interrupts the other processor. The first processor then calculates the free page location and informs the computing system of the location. The other processor is responsible for updating the bit map and summary buffers.

11 Claims, 8 Drawing Sheets

Subsystem Status Report Logic

Processor Initialization

Deallocating Pages

| STEP | X | Y |
|------|---|---|
| A | 0 | 0 |
| B | 1 | 0 |
| C | 2 | 0 |
| D | 3 | 0 |
| E | 4 | 0 |
| F | 0 | 1 |
| G | 1 | 1 |
| H | 2 | 1 | ← FOUND PAGE 9

FIG. 12

| STEP | X | Y |
|------|---|---|
| A | 0 | 0 |
| B | 1 | 0 |
| C | 1 | 1 |
| D | 1 | 2 | ← FOUND PAGE 6

BIT MAP SEARCH BY COMPETITIVE PROCESSORS

TECHNICAL FIELD

The invention is in the field of data processing, and specifically is directed to determining the allocation of memory pages in a computing system.

BACKGROUND ART

Bit maps offer a compact method of storing data describing the allocation state of memory pages in computing systems. The location of pages which are un-allocated may be determined algorithmically from the location of bits of a predetermined state. The condition of bit maps may be characterized by the density and distribution of bits of the state indicating the existence of an un-allocated page. It is a property of bit map search methods that some may be efficient when the map is sparsely populated with un-allocated pages while others may be efficient when the map is densely populated.

There are a number of articles and issued patents directed to memory search features, each having certain advantages and disadvantages.

IBM TDB, Vol. 22, No. 6, November 1979, pp 2489-90, entitled "Parallel Table Directed Translation" describes a method for performing vector operations such as a search process which uses p processors simultaneously and which is based solely on comparisons of search arguments on parallel processors of a single instruction multiple data stream (SIMD) type. The parallel computer implementable method searches multiple similar or dissimilar search arguments over the same table in order to obtain multiple outcomes. More particularly, the method is directed to the concurrent translation of p search arguments over the same linked list of vectors, which vectors form a preordered binary search tree on p processors. This requires each processor independently comparing a search argument with an ordered recursive scanning of a copy of the search tree. If there is a match, then a concordance between the search argument and a translation value is indicated. For a mismatch, a left or right tree search is executed if the search argument is respectively less than or greater than the nodal value.

U.S. Pat. No. 4,482,956, entitled, "Parallel Queueing Method" is directed to enabling a single chained queue to have parallel operations by plural element insertion routines and one deletion routine which may be simultaneously executing asynchronously on plural processors for deleting an element, while inserting one or more anchor-pointed elements. This is done by providing a dequeueing lock which is only examined by a program routine which is to delete an element, but is not examined by any program routine which is to make an insertion of an anchor-pointed element into the queue using a System/370 compare and swap instruction.

U.S. Pat. No. 4,639,856 entitled, "Dual Stream Processor Apparatus" sets forth a duel stream processor apparatus, for use in a multiprocessor computer system. The multiprocessor computer system includes at least a first processor and a second processor. A first apparatus and a second apparatus is included in both the first processor and the second processor for use when either the first or the second processor is inoperative. The first apparatus, disposed within the inoperative processor, suspends the functional operation of the inoperative processor. The second apparatus, disposed within the inoperative processor, transmits a miss signal to the other remaining functionally operational processor. When the other remaining processor receives the miss signal, it will not subsequently attempt to locate desired data in the cache of the inoperative processor. Rather, the other remaining processor will search for the desired data in the main memory in the event it cannot locate the data in its own cache.

According to the subject invention, a bit map search mechanism is implemented which supports parallel search of the bit map by differently optimized search methods so that the map search is optimized across the range of conditions. A bit map search is set forth in which a pair of dedicated microprocessors, each implementing a differently optimized search procedure, compete to be first to find a bit indicating an un-allocated page. On finding such a bit the successful microprocessor interrupts the losing processor. The losing processor is given the bit location and is responsible for updating the bit map and summary buffers while the winning processor calculates the free page location and informs the larger system.

DISCLOSURE OF THE INVENTION

A method and apparatus is described for performing a bit map search of the allocation state of memory pages in a computing system. The search is performed by at least first and second processors, each of which implements a differently optimized search procedure which compete to find an un-allocated page in the memory. The winning processor interrupts the losing processor, and informs the computing system of the page location. The losing processor updates the bit map.

BRIEF DESCRIPTION OF THE DRAWINGS

FIG. 10 is a representation of a system memory, bit map and X and Y registers which are helpful in understanding the competitive bit map search flow charts set forth in FIGS. 8 and 9;

FIG. 11 is a table illustrating the steps of the search procedure set forth in FIG. 8: and FIG. 12 is a table illustrating the steps of the search procedure set forth in FIG. 9.

DESCRIPTION OF THE PREFERRED EMBODIMENT

Figure 1:
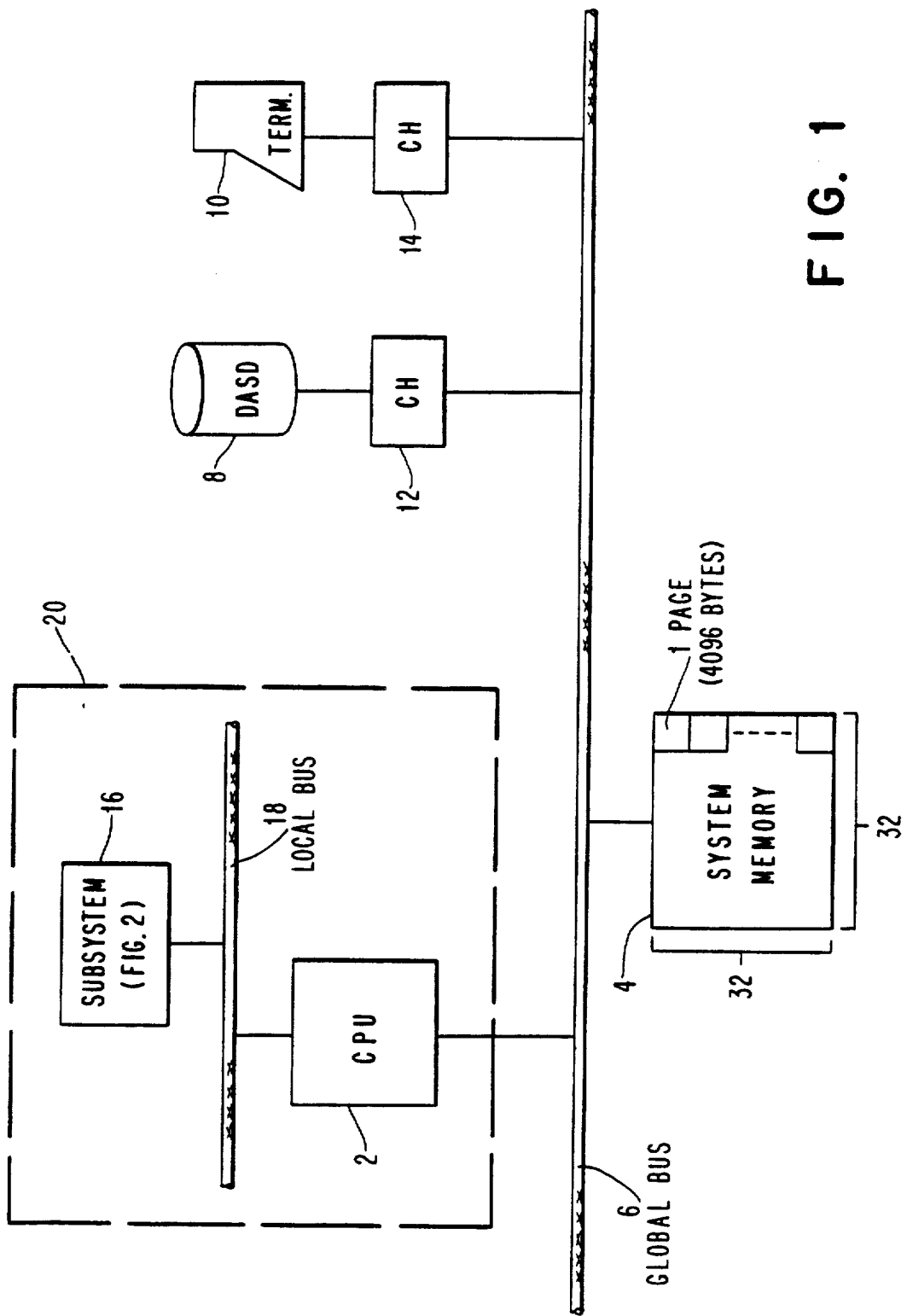
FIG. 1 is a block diagram of a computer system and subsystem.

Bit maps offer a compact method of storing data describing the allocation state of memory pages in computing systems. The location of pages which are un-allocated may be found algorithmically from the location of bits of a predetermined state. The condition of bit maps may be characterized by the density and distribution of bits of the state indicating the existence of an un-allocated page. It is a property of bit map search methods that some may be efficient when the map is sparsely populated with un-allocated pages while others may be efficient when the map is densely populated.

In the case that a bit map has a high density of bits which indicate un-allocated pages, a sequential search has a high probability of rapidly finding a bit in the desired state. In the event that a bit map has a low density of such bits, such a search typically requires a greater amount of time. It is possible to compress the data in a bit map, at the cost of lost information, into a summary form. Such a summary may consist of a pair of registers each with a number of bits which correspond to the number of rows in the bit map or the number of columns in the bit map. The bits in these registers are set in the event that a row or a column in the bit map contains at least one bit indicating an available page. A search procedure can be built which tests summary registers to find a row or column in the bit map in which a bit is to be found. This method requires, at most, the test for bits in either summary register followed by testing (sequentially) the content of one line in the bit map. This is faster than sequential search of the bit map if bits are so sparse that a search of two rows is unlikely to reveal a useful bit. A second search procedure using the summary register is the sequential search of all possible bit locations indicated by the presence of a row and column bit in the summary registers. The space to be searched by that method is only as large as the product of the number of set bits in the summary registers. At intermediate bit map densities, this is competitive with full-map sequential search.

It is common practice, when possible, to embody a memory management system as a single integrated circuit. The preferred embodiment shown here assumes that each of the logical components of the system are implemented as a portion of a Large Scale Integrated Circuit. It is to be appreciated, however, that the logical components may be implemented as discrete devices, or a combination of integrated circuit devices.

A central processor (CPU) which functions as a served or context processor is connected to a system memory via a global bus. The CPU is also connected to a subsystem via a local bus. The subsystem is utilized to determine the allocation state of pages in the system memory. The subsystem includes two microprocessors, with each microprocessor having a local memory; a two-port bit map memory; status reporting logic; and X and Y registers.

A region of bit map memory with dimensions x bits by y bits (where x multiplied by y is sufficient to provide one bit for each page of system memory) is connected to the pair of microprocessors which are in turn connected to the internal bus of the CPU in which the subsystem is embedded. The internal bus is that one from which the CPU expects to read the page number of a free page in memory. The local bus may also be used to supply data to the system such as the page number of de-allocated memory pages. In addition to the data reporting lines of the local bus, (the lines on which the numbers of pages will be asserted), lines are provided to report the system status to the CPU and to receive commands from the CPU. The commands from the CPU may include reset, initialize, initiate bit map search, and update bit map memory to mark a page free. In a typical implementation of the system, the status report would be at least three lines wide to permit reporting the states subsystem idle, search in progress, data available, system failure, and no pages free. These lines would typically be driven by a collection of logic which accepts status information from both processors and from the service request line, and which would derive correct states for the status-reporting lines from that information.

Both embedded microprocessors are provided access to a pair of working registers of length X and Y respectively. These registers constitute a hardware support feature specifically for the search algorithm that one processor executes. That processor, therefore, has priority in access to those registers. It should be understood that these registers are an example of algorithm - specific support hardware and that other such support hardware may be chosen for the benefit of rapid execution of other search algorithms without departing from the spirit of this invention.

Each microprocessor is able to execute a program stored in a memory which is local to that processor. Means may be provided to modify that program by overwriting the local memory or causing the processor to execute programs in other accessible memory. Each processor is able to interrupt the execution of the other processor through connections provided for that purpose.

The subsystem processors begin execution at power on time by setting each bit of the bit map memory and the X and Y registers to the state which indicates that a page is available. For this example, let us assume that this state is "ON" or "1". The processors then enter a state in which they await a command from the context processor, for example, to find the address of a free page of memory.

In order to understand the operation of the system it is necessary to understand the search algorithms of the processors. The search algorithms chosen for the processors are optimized to provide the most rapid search under different conditions of the bit map. Broadly speaking, the bit map may be densely or sparsely populated with memory states indicating free pages. For the sake of the example, assume the search algorithm of the first processor is a simple serial search in which each successive bit of memory is examined as to its' state. The second processor, on the other hand, uses the X and Y registers to hold a summary of the bit map state. In this summary form, if any bits in the i'th row of the bit map indicate an available page, then the i'th bit of the Y register shows the page-available state. Similarly, if any bits in the j'th column are set "ON" then the j'th bit of the X register is "ON". The second processor may thus execute a hardware-assisted search in which the Y register is first examined to find a promising row to search and then the X register is examined to find which individual bits are promising. It should be understood that these algorithms are examples chosen because of their clear differences in efficiency in dense and sparse bit map search cases. Other search algorithms may be chosen without departure from the spirit of this invention.

In the event that the command lines change state to indicate that a search should be initiated, both processors begin to execute their respective stored programs describing their respective search algorithms. This change in command line and processor state is coded by status report logic to indicate that a search is in progress. In accord with its program, processor one goes directly to the bit map, finds a bit (since the map is filled with 1's) which indicates the address of free page, interrupts the second processor, translates the location of the found bit into a page number, places that page number on the data lines, and informs the status control logic that a search has succeeded. The status line control logic then changes the status lines to show data available.

The second processor will not have succeeded in finding a free page because it is in the process of searching a summary register at the time of the first processor's success. On receiving the interrupt from processor one, processor two will read the data lines set by processor one, and modify the content of both the bit map and the summary registers to reflect the allocation (unavailability) of the found page.

Assume that the process of allocating and deallocating pages has continued until such time as the search algorithms of the two processors have essentially the same probability of success and that the "winner" depends on the specific state of the bit map memory. At some time, a request for a free page number will be received, and both processors will race to find it. If, in this case, the summary register data processed by the second processor points to a bit in the bit map which is in fact free, and the second processor verifies the state of the bit before the first processor is able to find a free page-indicating bit, it will be the second processor which interrupts the first and decodes and asserts the found page number, and the first processor which, in parallel, updates the bit map and summary registers. It should be understood that the processor must verify the state of the bit map entry because the summary registers will only indicate that bits have a high probability of being 1's, not that they actually are 1's.

In the normal course of events, pages are de-allocated by the context processor operating system. The de-allocation may proceed by processor one (for example) updating first the memory map and then the summary registers.

In the event that there are no available pages, processor two is the first to discern this state by the absences of any "ON" bits in a register. On this finding, processor two inform the status line control logic which encodes that state on the status lines. Processor one may be halted by this action. The context processor operating system may then de-allocate pages as required. If only one register showed no "ON" bits, this indicates a system failure.

It is possible for any part of a computing system to fail. Failure of one of the system processors is noted by the status line logic by the failure of that processor to initiate appropriate actions on command. This failure could then be reported on the status lines. It should be noted that this system will fail-soft for some types of processor failures. This allows continued, albeit slower operation in some cases.

The command "reset" causes both processors to halt and return to command-ready states. The command "initialize" causes both processors to execute their power-on sequence instructions causing the bit map to be set to all bits "ON".

A detailed description of the invention is set forth below. FIG. 1 is a generalized block diagram of the system. A CPU 2 is connected to a system memory 4 via a global bus 6. Other devices may be connected to the bus 6, such as a DASD 8 and a terminal 10 via channels 12 and 14, respectively. The system memory may be of any convenient size, but is chosen for this description to be 32 by 32 pages, with each page being comprised of 4096 bytes (4 Kilobytes).

The allocation state of the pages in the system memory 4 is recorded in a subsystem 16 which is connected to the CPU 2 via a local bus 18. The CPU 2 and the subsystem 16 may be formed on a single integrated circuit chip 20 or may be formed of discrete devices or combinations of integrated circuits or devices.

Figure 2:
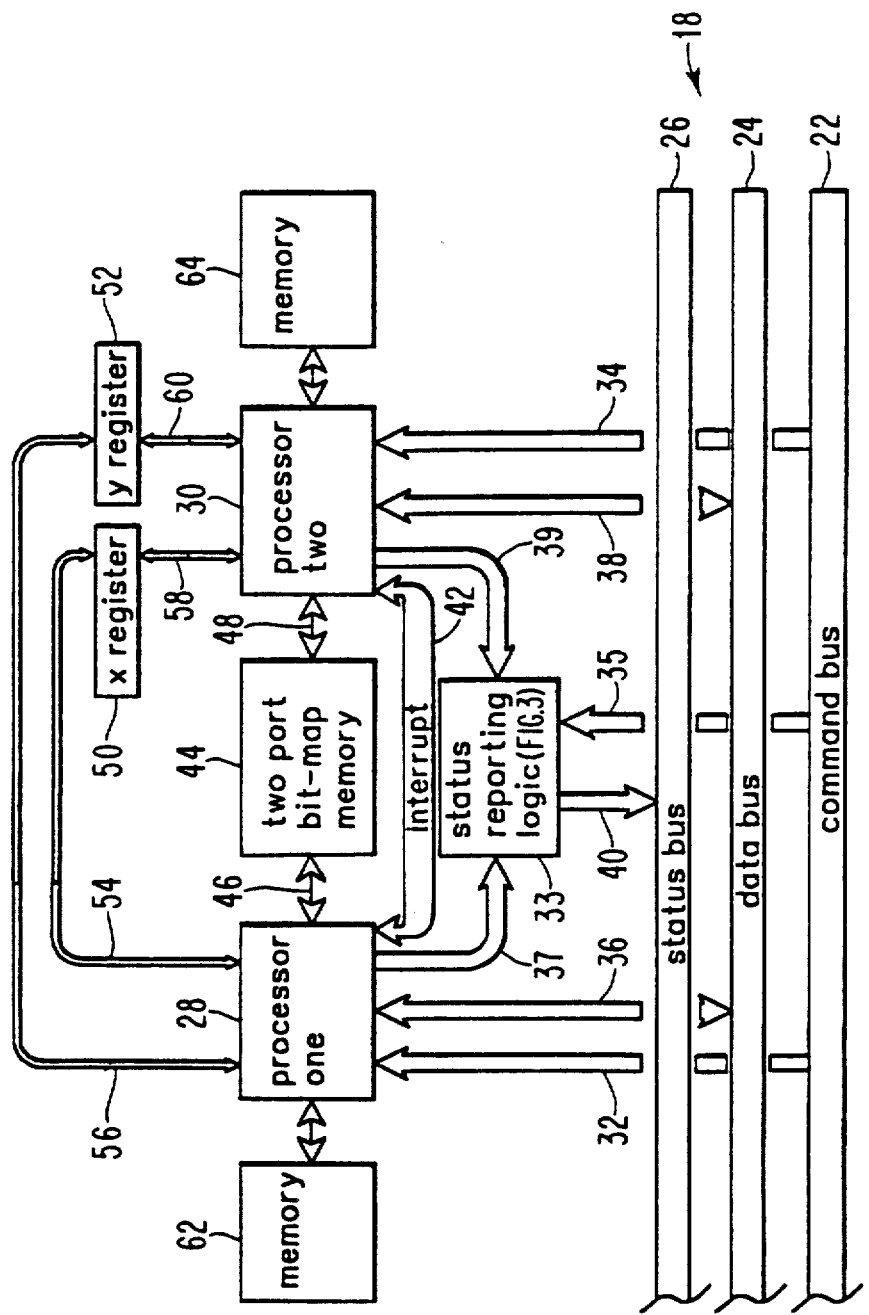
FIG. 2 is a detailed block diagram of the subsystem which is shown generally in FIG. 1.

FIG. 2 is a detailed block diagram of the subsystem 16 of FIG. 1. The local bus 18 is comprised of a command bus 22, a data bus 24 and a status bus 26. The command bus 22 is connected to microprocessors 28 and 30 via lines 32 and 34, respectively and to status reporting logic 33 via lines 35. The data bus 24 is connected to processors 28 and 30 via lines 36 and 38, respectively. Status bus 26 is connected to status reporting logic 33 via lines 40. Processors 28 and 30 are connected together via an interrupt lines 42, and each processor is connected to a two port bit map memory 44 via lines 46 and 48, respectively. Processor 28 is connected to an X register 50 and a Y register 52 via lines 54 and 56, respectively, and processor 30 is connected to X register 50 and Y register 52 via lines 58 and 60, respectively. Processor 28 is connected to a local memory 62 and processor 30 is connected to a local memory 64. Activity codes and code strobes are provided from processors 28 and 30 to logic 33 via lines 37 and 39, respectively.

The bit map memory 44 is 32 bits by 32 bits in size, with each bit being indicative of the allocation state of a predetermined page in the system memory 4 (FIG. 1). For purposes of description only, the convention is adopted that if a given bit in memory 44 is a ONE "1", the associated page in system memory 4 is un-allocated, and conversely if the given bit in memory 44 is a ZERO "0" the associated page in system memory 4 is allocated.

Figure 10:
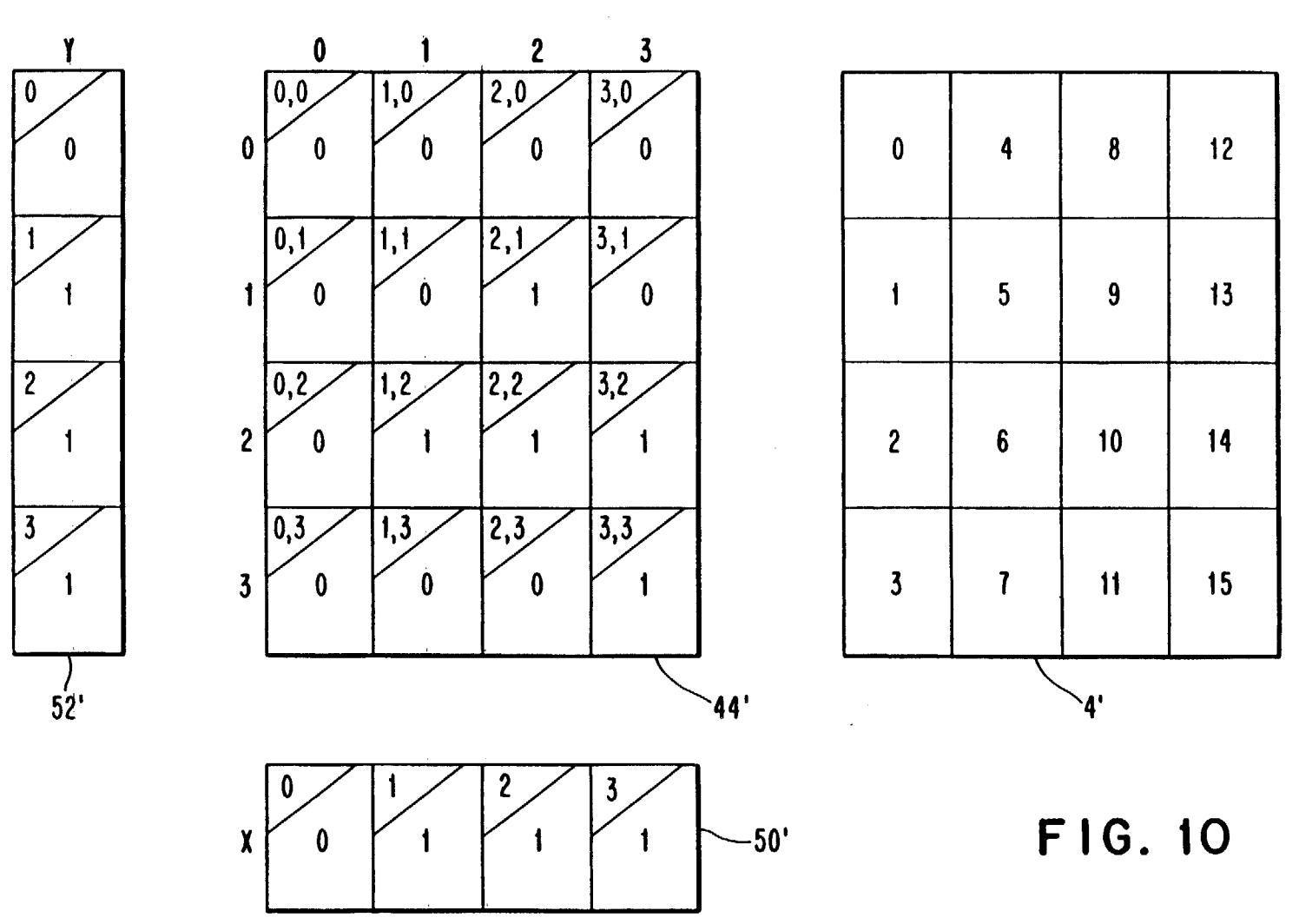

The X register 50 and Y register 52 are each 32 bits long. Refer briefly to FIG. 10 for an explanation of the function of registers 50 and 52.

The bit map 44' is shown to be 4 bits by 4 bits for ease of explanation, and likewise registers 50' and 52' are each shown to be 4 bits in length. If at least one bit in row "0" of bit map 44' is a ONE, the bit in the "0" position of Y register 52' is a ONE, conversely if all of the bits in row "0" of bit map 44' are ZERO, as, shown, the bit in the "0" position of Y register 52' is a ZERO, as shown. In row positions 1, 2 and 3 of Y register 52', each bit is ONE, as there is a ONE in at least one bit position of rows 1, 2 and 3, respectively of bit map 44'. In X register 50', bit position 0 is a ZERO since each of the bit positions in column 0 of bit map register 44' are at ZERO. In column positions 1, 2 and 3 of X register 50' the bit is ONE, as there is a ONE in at least one bit position of columns 1, 2 and 3 of bit map 44'.

Each of processors 28 and 30 execute programs stored in memories 62 and 64 respectively to search for an un-allocated page in the system memory 4 (FIG. 1). Processor 28 executes a program optimized for searching a densely populated bit map, as set forth in detail relative to FIG. 8, by searching bit map 44. Processor 30 executes a program optimized for searching a sparsely populated bit map by searching X and Y registers 50 and 52 respectively and verifying the content of bit positions in bit map 44, as set forth in detail relative to FIG. 9. The details of these programs are to be discussed shortly.

Figures 3, 4:
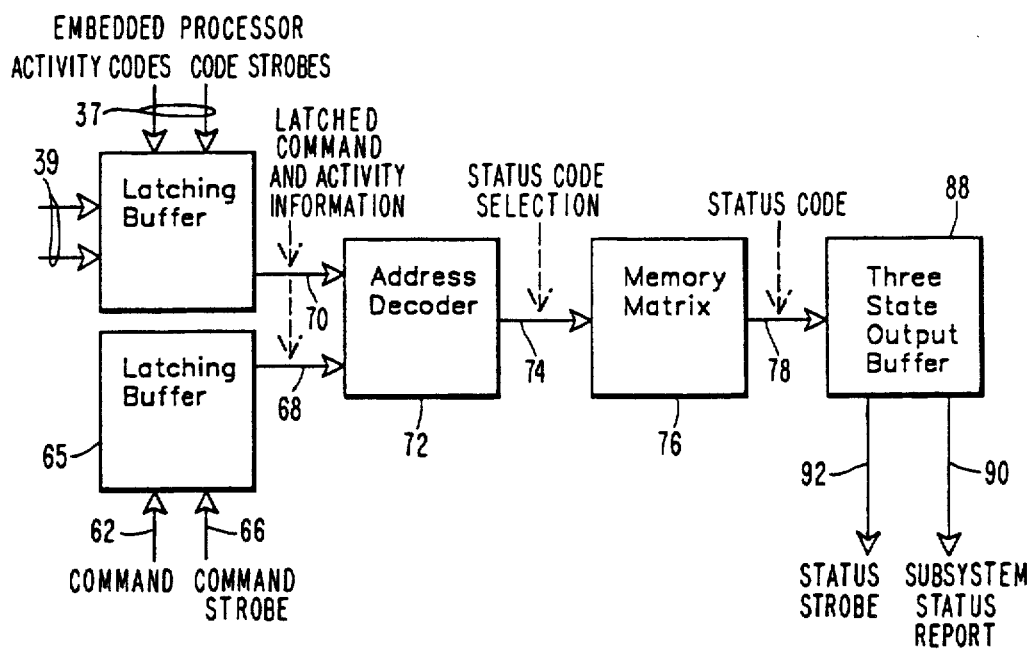
FIG. 3 is a detailed block diagram of the status reporting logic which is shown generally in FIG. 2.
FIG. 4 is a simplified table of computer commands utilized in the practice of the invention.

When in need of a free page, the CPU 2 (FIG. 1) initiates a search of the allocation state of pages in system memory as manifested by bit map memory 44, by setting the command lines to the appropriate code. The response of the processors to that command is encoded by the status reporting logic 33. This allows the CPU 2 to make an informed decision about the responsiveness of the subsystem based on the activities of processors 28 and 30 as manifested by status reporting logic 33. With reference to FIG. 3, a command from CPU 2 on line 63 from command bus 22 is latched into latching buffer 65 with the concurrent application of a command strobe on line 66 from command bus 22, which is indicative of the command line state being valid. The nature of these commands are detailed shortly. Activity codes and code strobes are provided on lines 37 from processor 28 and like connections are provided from processor 30 on line 39. The latched commands and activity codes are provided via lines 68 and 70, respectively, to address decoder 72. In response thereto, decoder 72 provides a status code selection address on line 74 to memory matrix 76. Matrix 76 responds to the provided address signal by providing a status code on line 78 to output buffer 88. Buffer 88 provides a subsystem status report signal on line 90 and a status strobe, indicative of a valid status report on line 90, to status bus 26 for provision to CPU 2.

The representative, but not all inclusive, commands which may be provided from CPU 2 to status reporting logic 33 via command bus 35 are set forth in the table shown in FIG. 4. Four such commands are shown, "No activity" (000); "Initialize" (100); "De-allocate" (010); and "Search" (001). As will be shown later, the Reset command is indicated by any command (in this simplified example) in which two or more command lines are set to "ONE".

Figure 5:
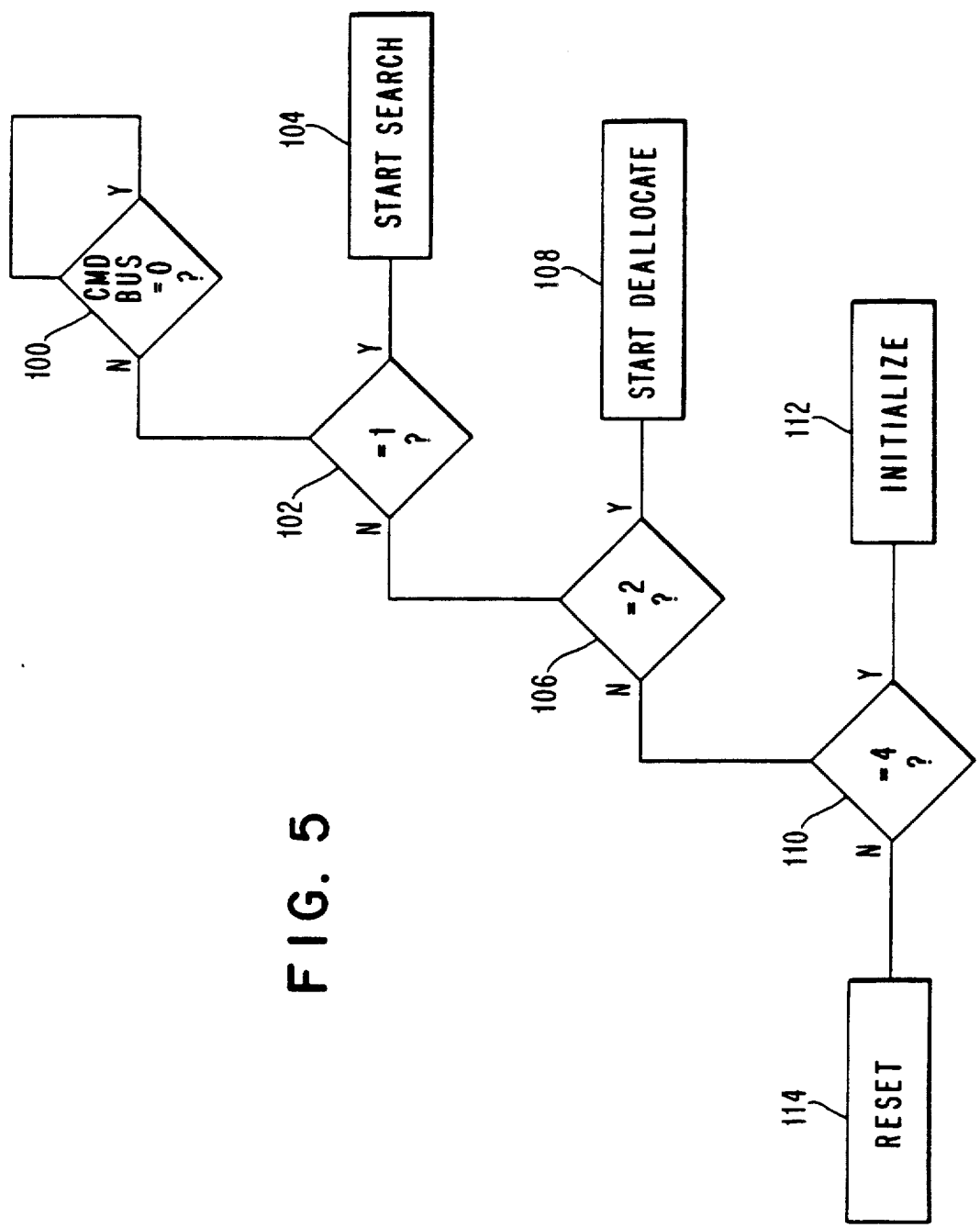
FIG. 5 is a flow chart showing how commands of FIG. 4 are distinguished by the subsystem.

A flow chart indicative of the process executed by both subsystem processors for determining which command is called for, is set forth in FIG. 5. A determination is made at decision block 100 whether or not the command bus is equal to 0, which is indicative of the "No activity" command. If the answer is YES there is a loop back to the input of 100 to once again look for a command. If the answer is then NO, the process steps to decision block 102 to determine if a "Start Search" command has been received. If the answer is YES, a search is initiated by processors 28 and 30 as indicated at 104, the details of which are discussed shortly relative to FIGS. 8 and 9. If the answer is NO the process steps to decision block 106 to determine if the command is "Start De-allocate". If the answer is YES, as indicated at 108 the de-allocation of pages is begun as set forth in detail relative to FIG. 7. If the answer is NO the process proceeds to decision block 110 to determine if the command is "Initialize". If the answer is YES as indicated at 112 the initiate process is begun as detailed in FIG. 6. If the answer is NO a "Reset" command is processed as indicated at 114.

Figure 6:
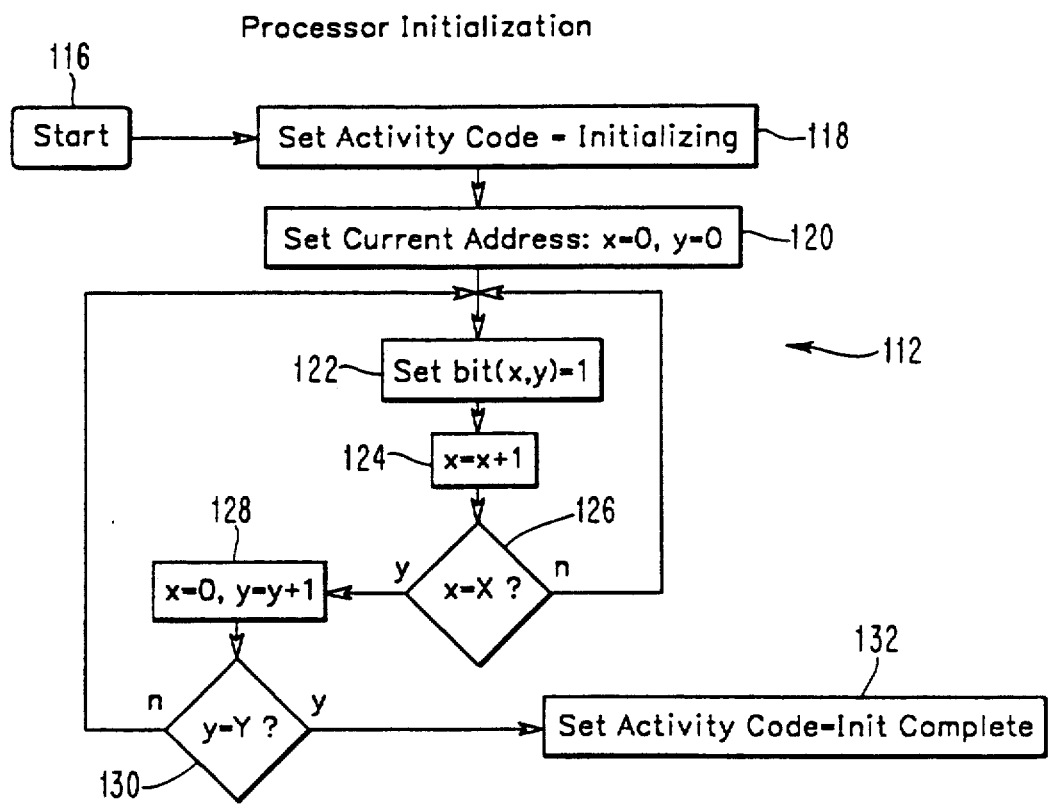
FIG. 6 is a flow chart of how processor initialization is performed.

Processor initialization is begun for processors 28 and 30 in response to the "Initialize" command. The flow chart for the initialization process 112 (FIG. 5) is shown in FIG. 6. The process is started at logic block 116 and proceeds to block 118 where the activity code is set to indicate "Initializing". Next the current address is set to: x=O, y=O as indicated at 120. Following this, bit (x,y) in the bit map is set equal to 1 as indicated at 122. It should be understood that the X register 50 and Y register 52 of FIG. 2 will also be set at step 122. Next, x is incremented by 1 as indicated at 124. At 126, a determination is made if x=X, where X is the number of columns in the bit map. If the answer is NO, the process loops back to 122, and 122, 124 and 126 repeat until the answer at 126 is YES. The process then steps to 128 where x is reset to zero and y is incremented by one. The process then proceeds to decision block 130 where it is determined if y=Y, where Y =number of rows in the bit map. If the answer is NO, the process loops back to 122 and 124, 126 and 128 are repeated until the answer to decision block 130 is YES, in which case all bit positions have been initialized. The activity code is then set to "Initialization Complete" as indicated at 132.

Figure 7:
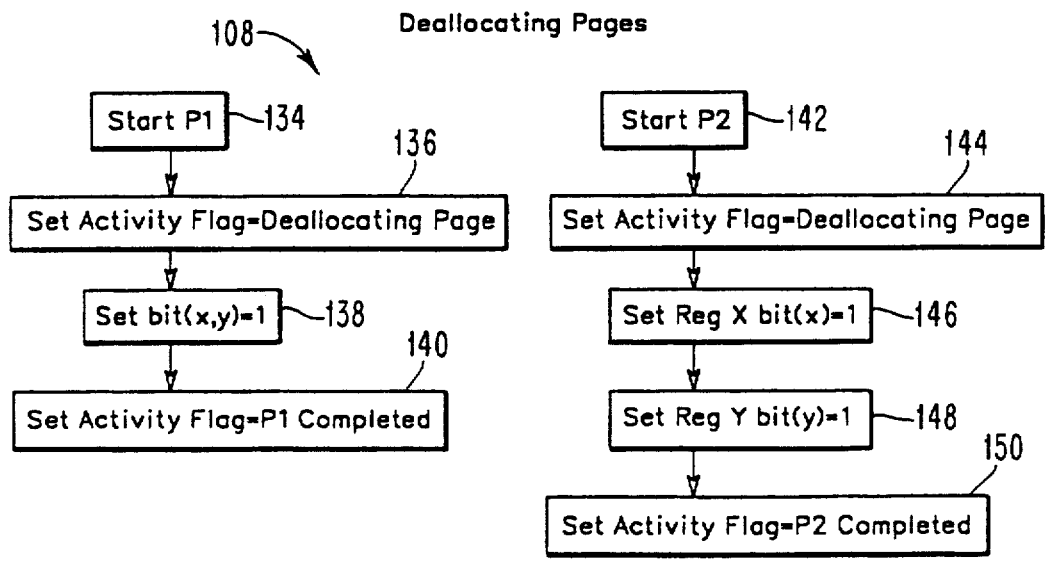
FIG. 7 is a flow chart of how page de-allocation is accomplished.

The de-allocation process 108 (FIG. 5) is shown in detail in FIG. 7 for processors 28 and 30. Assume that the page whose status bit is at location (x,y) in the bit map is to be de-allocated. The de-allocation process for processor 28 starts at 134. At 136, the activity flag is set to "De-allocating Page". Next at 138 bit (x,y) in the bit map is set equal to 1. The process is complete at 140 with the activity flag being set to "P1 completed".

The de-allocation process for processor 30 begins at 142. At 144 the activity flag is set to "De-allocating Page". Next at 146, Register X bit (x) is set equal to 1. At 148, Register Y bit (y) is set equal to 1. The process is complete at 150 with the activity flag being set to "P2 Completed".

The "Start Search" command 104 (FIG. 5) starts processors 28 and 30 to concurrently begin their search procedures to find an un-allocated page in the system memory 4 (FIG. 1). As previously explained, the search procedures are optimized to provide rapid search under differing conditions of the bit map 44 (FIG. 2). The bit map 44 may be densely or sparsely populated with memory states indicating free pages in system memory 4, or the population may be in an intermediate state.

By way of example, the search process for the first processor 28 is optimized to search a densely populated bit map utilizing a simple serial search in which each successive bit of the bit map memory 44 is examined as to its' state. The processor 28's search process is detailed in FIG. 8.

By way of example, the search process for the second processor 30 is optimized to search a sparsely populated bit map utilizing the X and Y registers 50 and 52 (FIG. 2) which hold a summary of the bit map state of bit map 44. In the summary form, if any bits in the i'th row of the bit map 44 indicate an available page, then the i'th bit of the Y register 52 shows the page available state. Similarly, if any bits in the j'th column are ONE then the j'th bit of the X register 50 is ONE. The second processor 30 thus executes a hardware assisted search in which the X register 50 is examined to find which individual columns of the bit map are promising and the Y register 52 is examined to find which positions in those columns are promising. The processor 30's search process is detailed in FIG. 9.

It is to be appreciated that the search processes set forth below are examples which were chosen because of their clear differences in probability of success in searching dense and sparsely populated bit maps. Other search procedures may be implemented without departure from the spirit of this invention.

As set forth above, the first processor 38 (FIG. 2) utilizes a search procedure optimized for a densely populated bit map. A serial bit map search is described relative to FIG. 8 as representative of such a search procedure. Concurrently refer to FIGS. 10 and 11 to aid in the understanding of the flow chart of FIG. 8.

FIG. 10 shows a map of a 16 page system memory map 4' arranged to show the correspondence of bits to pages in a 4 by 4 bit map 44'. A 4 bit X register 50' and a 4 bit Y register 52' are also shown. The size of 4, as opposed to 32 is used in describing FIGS. 1 and 2, is for ease of description of the bit map search procedures relative to FIGS. 8 and 9. The bit map 44' shows unallocated pages by a binary "1". It is seen that bit map locations 2,1; 1,2; 2,2; 3,2; and 3,3 are at a binary "1" which corresponds to pages 9,6,10,14 and 15, respectively of system memory mapped in 4' being unallocated. X register 50' has a "0" in location 0, which is indicative of all bit locations in column 0 of bit map 44' being a "0". Locations 1,2 and 3 of X register 50' are each a "1" which is indicative of there being a "1" in at least one location in each of columns 1,2 and 3, respectively, of bit map 44'. For example, there is a "1" at location 1,2 of column 1, a "1" at locations 2,1 and 2,2 of column 2 and a "1" at locations 3,2 and 3,3 of column 3. Y register 52' has a "0" at location 0, which is indicative of all bit locations in row 0 of bit map 44' being a "0". Locations 1,2 and 3 of Y register 52' are each at a "1" which is indicative of there being a "1" in at least one location in each of rows 1,2 and 3, respectively, of bit map 44'. For example, there is a "1" at location 2,1 of row 1, a "1" at locations 1,2; 2,2; and 3,2 of row 2, and a "1" at location 3,3 of row 3.

Figure 8:
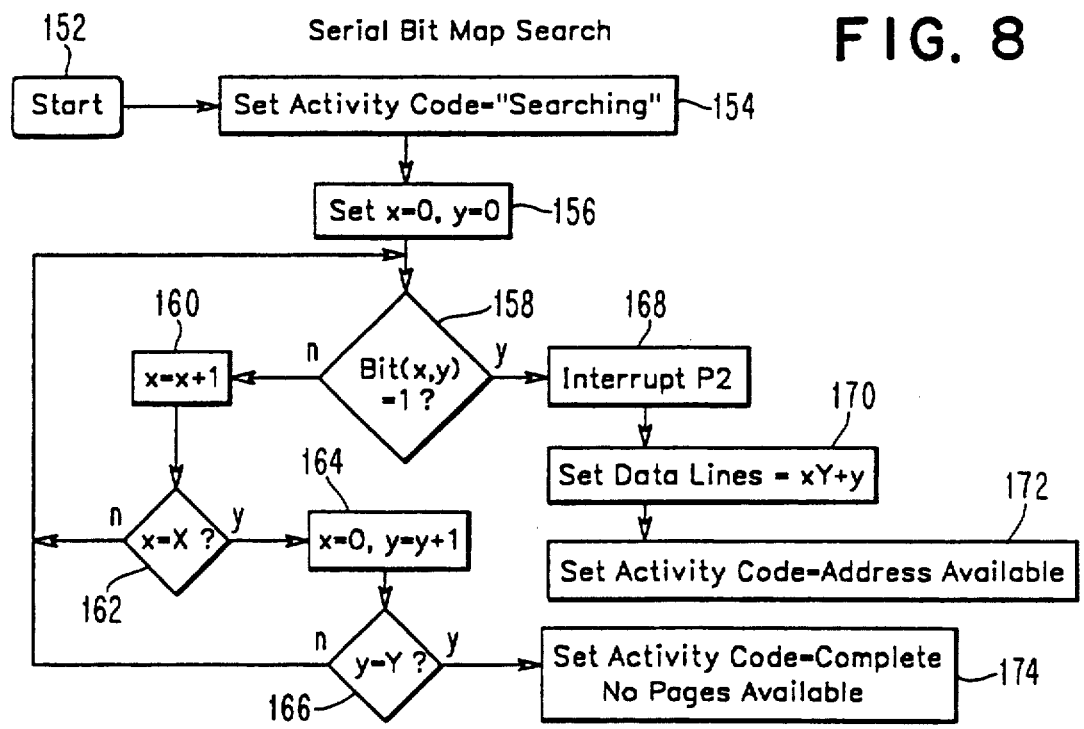
FIG. 8 is a flow chart detailing a serial bit map search according to the invention.

A serial bit map search, by processor 28 (FIG. 2), optimized for a densely populated bit map is shown in FIG. 8. The search is started as indicated at 152, and the activity code is set to "Searching" as indicated at 154. As indicated at 156, x and y are each set to 0, which corresponds to location 0,0 in the bit map 44'. At 158, a test is made to determine if bit (0,0) of the bit map 44' is equal to "ONE". It is seen that location 0,0 in bit map is "0", so the answer is NO. This corresponds to step A in FIG. 11. Next, at 160, x is incremented to x+1, resulting in x=1. A determination is made if x=X, where X=4, the X dimension of bit map 44'. Since x=1, x is not equal X and a return is made to 158, where Bit(x,y) now is Bit(1,0) as indicated at step B in FIG. 11. Bit(1,0) is a "0" as seen in bit map 44', therefore, the search steps to 160 and x is incremented to 2. At 162, x(=2) is not equal to X(=4), so a return is made to 158 where Bit(x,y) is now Bit(2,0) as indicated at step C of FIG. 11. Bit(2,0) is a "0" as seen in bit map 44'. Therefore the search steps to 160 and x is incremented to 3. At 162 x(=3) is not equal to X(=4), therefore a return is made to 158 where Bit(x,y) is now Bit(3,0) as indicated at step D of FIG. 11. Bit(3,0) is a "0" as seen in bit map 44', therefore, the search steps to 160 and x is incremented to 4. At 162, x(=4) is equal to X(=4) as seen at step E in FIG. 11, and the search steps to 164 where x is set equal to 0 and y is incremented by 1 to y=1. The search then steps to determine if y=Y where Y=4 the size of the Y dimension in bit map 44'. In this instance y(=1) is not equal to Y(=4), therefore the search steps to 158 where Bit(x,y) is now Bit (0,1) as indicated at step F of FIG. 11. Bit (0,1) is a "0" as seen in bit map 44'. Therefore the search steps to 160 and x is incremented by 1 to x=1. At 162 x(=1) is not equal to X(=4), therefore a return is made to 158 where Bit(x,y) is now Bit(1,1) as indicated at step G of FIG. 11. Bit(1,1) is a "0" as seen in bit map 44'. Therefore the search steps to 160 and x is incremented to 2. At 162, x(=2) is not equal to X(=4), therefore a return is made to 158 where Bit(x,y) is now Bit(2,1) as indicated at step H of FIG. 11. Bit(2,1) is a "1" as seen in bit map 44', which is indicative of an un-allocated page in the system memory map 4'. P2, processor 30 (FIG. 2), is interrupted as indicated at 168 to inform it that it lost. Next, at 170 the data lines are set equal to xY+y to indicate the number of the available page in system memory. In this instance the result is (2)·(4)+(1)=9. This page 9 shown in system memory map 4' is associated with location (2,1) of bit map 44'. At 172 the activity code is set to indicate that the number of an available page (9) of system memory is on the data lines. In the event that bit map 44' contains "0" in each location, which is indicative of there being no pages available, the search finally would have stepped to 166 when y(=4)=Y(=4). Then, as indicated at 174, the activity code would have been set to "no pages available".

Figure 9:
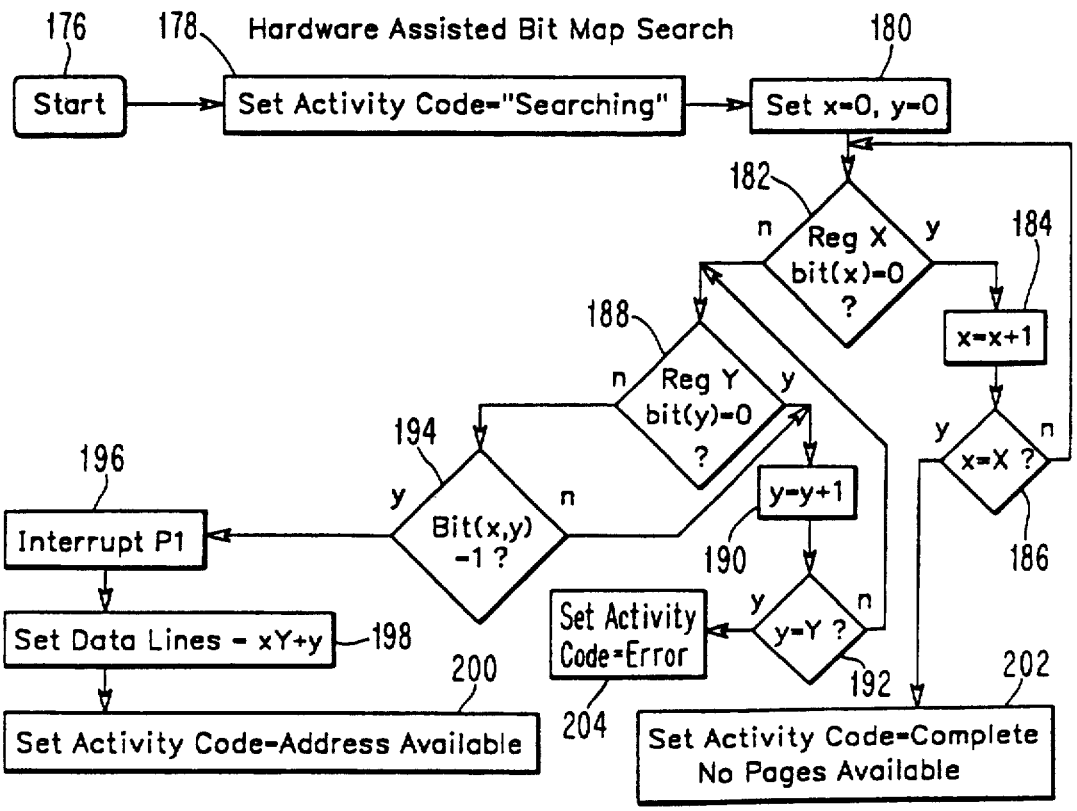
FIG. 9 is a flow chart of a hardware assisted bit map search according to the invention.

A Hardware assisted bit map search, by processor 30 (FIG. 2), optimized for a sparsely populated bit map is shown in FIG. 9. The hardware assist is provided by X register 50' and Y register 52', as shown in FIG. 10. Returning to FIG. 9, the search starts at 176, and the activity code is set to "Searching" as indicated at 178. At 180, bits x and y are each set to "0". This corresponds to step A in FIG. 12. At 182 Register X bit(0) is found equal "0", so the search steps to 184 and x is incremented by 1 to x=1. At 186, x(=1) is not equal to X(=4), so a return is made to 182 where Register X bit(1) is found not to equal "0", as location 1 in Register X is a "1". This is indicative of there being at least one "1" in column 1 of bit map 44'. At 188 it is determined that Register Y bit(0) is equal to "0", which means that all bit locations in row 0 are "0". This corresponds to step B of FIG. 12. The search steps to 190 and y is incremented by 1 to y=1. At 192 it is determined that y(=1) is not equal to Y(=4) and the search returns to 188. It is determined that Register Y bit(1) is not equal to "0" as there is a "1" at location 1, which is indicative of there being a "1" in at least one location in row 1. The search then goes to 194 to determine if Bit(1,1) of bit map 44' is a "1". This corresponds to step C of FIG. 12. It is seen the answer is NO as there is a "0" at location (1,1) of the bit map. The search then returns to 190 and y is incremented to 2. At 192 y(=2) is not equal to Y(=4) so the search returns to 188 where it is determined if Register Y bit(2) is equal to "0". Bit 2 is a "1", so the answer is "no" and the search proceeds to 194 to determine if Bit(1,2) is equal to "1". This corresponds to step D of FIG. 12. It is seen that Bit (1,2) in bit map 44' is a "1", which is indicative of an un-allocated page in system memory map 4'. As indicated at 196 processor P1, processor 28 of FIG. 2, is interrupted to inform it that it lost. At 198 the data lines are set equal to xY+y which is (1)·(4)+(2)=6. This is indicative of page 6 in system memory map 4' being un-allocated. It is seen that page 6 of system memory map 4' is associated with location (1,2) of bit map 44'. At 200 the activity code is set to indicate that the number of an available page is set on the data lines. In the event the X register 50' has a "0" in each of its bit locations, which is indicative of there being no pages available, the search would have stepped from 186 to 202 and the activity code would be set to "no pages available". If a one had been found in Register X but not in Register Y, an error would be indicated by stepping from 192 to 204, setting an activity code indicating an error.

It should be clear to all who are skilled in the art that the resources of this subsystem could be utilized by any number of other search algorithms, including hardware assisted search algorithms which resemble that shown in FIG. 9, in which each processor uses one or the other register for its preliminary search. Similarly, the serial search of FIG. 8 could be further improved by setting (x,y) in step 156 equal to the page number one past the last allocated page. These and variations on the support hardware should not be construed as departing from the spirit of the invention.

Industrial Applicability

It is an object of the invention to provide an improved means of determining the allocation of memory pages in a computing system.

It is another object of the invention to provide an improved means of determining the allocation of memory pages in a computing system by performing a competitive search by a pair of processors.

It is yet another object of the invention to provide an improved method and apparatus for performing a bit map search of the allocation state of memory pages in a computing system. A competitive search is performed by a pair of processors, each of which implements a differently optimized search procedure to find an un-allocated page in the memory. The winning processor interrupts the losing processor, and informs the computing system of the page location. The losing processor updates the bit map and registers.

Having thus described our invention, what we claim as new, and desire to secure by Letters Patent is:

1. In a computer system, apparatus for determining the allocation of memory pages, comprising:
   a central processor;
   a memory, including n, where is an integer, memory pages, with said memory connected to said central processor;
   a bit map which includes n bits, each of said n bits being indicative of the allocation state of an associated page in said memory;
   a pair of processors, each of which is connected to said central processor and said bit map, and each of which implements a different competitive search procedure of said bit map, to determine an un-allocated page in said memory; and
   means for the first processor of said pair of processors to determine an un-allocated page in said memory as the result of said search procedure, to communicate the location of the un-allocated page in said main memory to said central processor.

2. In a computer system, apparatus for determining the allocation of memory pages, comprising:
   a central processor;
   a memory, having n×m memory pages, where n and m are integer, with said memory connected to said central processor;
   a bit map which includes n×m bits, with the state of each bit being indicative of whether or not an associated page in said memory is allocated or un-allocated, with a given bit being in a first state when its associated page is un-allocated, and being in a second state when its associated page is allocated;
   a first processor connected to said central processor and said bit map, and which performs a first search procedure, optimized for a bit map densely populated with bits in said first state, of said bit map in response to a search request from said central processor to determine an un-allocated page in said memory;
   a second processor connected to said central processor, said first processor and said bit map, and which performs a second search procedure, optimized for a bit map sparsely populated with bits in said first state, of said bit map in response to said search request from said central processor to determine an un-allocated page in said memory; and
   means for the first one of said first and second processors to determine an un-allocated page in said memory as the result of the search procedure to communicate the location of the un-allocated page in said main memory to said central processor, and to interrupt the search procedure of the other one of said first and second processors.

3. In a computer system, the combination comprising:
   a central processor;
   a system memory comprised of n pages, where n is an integer, said memory being connected to said central processor;
   a subsystem connected to said central processor for determining the allocation state of said n pages in said system memory, said subsystem including:
   a bit map having n bits, with each of said n bits being indicative of the allocation state of an associated page in said system memory;
   a pair of processors, each of which is connected to said central processor and said bit map, and each of which performs a different bit map search procedure to find an un-allocated page in said system memory, in response to a search request from said central processor; and
   means for the first processor of said pair of processors to find an un-allocated page indication in said bit map to communicate the location of the associated page in said system memory to said central processor.

4. The combination claimed in claim 3, including:
   means for the first processor of said pair of processors to interrupt the bit map search procedure of the second processor of said pair of processors in response to said first processor of said pair of processors finding an un-allocated page in said system memory.

5. The combination claimed in claim 4, including:
   means for the second processor of said pair of processors to update the allocation state of the found un-allocated page of said bit map from un-allocated to allocated following the interrupt from said first processor of said pair of processors.

6. In a computer system, the combination comprising:
   a global bus;
   a central processor connected to said global bus;
   a system memory connected to said central processor via said global bus, a system memory having n×m pages, where n and m are integers;
   a local bus connected to said central processor;
   a subsystem connected to said central processor via said local bus, for determining the allocation state of pages in said main memory in response to search requests by said central processor, said subsystem including:
   a bit map having n×m bits, with each bit being indicative of the allocation state of an associated page in said system memory;

a first processor connected to said central processor via said local bus and connected to said bit map, which performs a first search procedure of said bit map to find an un-allocated page in said system memory in response to a search request from said central processor;

a second processor connected to said central processor via said local bus and connected to said bit map, which performs a second search procedure, different than said first search procedure, to find an un-allocated page in said system memory in response to said search request from said central processor; and means for the first one of said first processor and said second processor to find an un-allocated page in said bit map to communicate the location of the associated page in said system memory to said central processor.

7. In a computer system, apparatus for determining the allocation of memory pages, comprising:

a central processor;

a memory connected to said central processor, and having n rows by m columns of memory pages, where m and n are integers;

a bit map which includes n rows by m columns of bits, with the state of each bit being indicative of whether or not an associated page in said memory is allocated or un-allocated, with a first bit state being indicative of an un-allocated page and a second bit state being indicative of an allocate page;

a first register of n bits which holds a summary of the bit map state of each of said n rows, with the i'th bit of said first register being in said first bit state if at least one at the bits in the i'th row of said bit map are in a said first bit state, and being in said second state;

a second register of m bits which holds a summary of the bit map state of each of said m columns, with the j'th bit of said second register being in said first bit state if at least one of the bits in the j'th column of said bit map are in said first bit state, and being in said second bit state if all the bits in the j'th row are in said second state;

a first processor connected to said central processor, said bit map and said first and second registers, and which performs a first search procedure of said bit map in response to a search request from said central processor to determine an un-allocated page in said memory with said first search procedure being optimized for said bit map being densely populated with bits in said first bit state;

a second processor connected to said central processor, said bit map and said first and second registers, and which performs a second search procedure of said bit map by searching said first and second registers in response to said search request from said central processor to determine an un-allocated page in said memory, with said second search procedure being optimized for said bit map being sparsely populated with bits in said first bit state; and means for the first one of said first and second processors to find an un-allocated page in said memory as a result of said first and second search procedures, to communicate the location of the un-allocated page to said central processor.

8. The combination claimed in claim 7, including;

means for interrupting the search procedure of the one of said first and second processors that did not find an un-allocated page; and means for said one of said first and second processors to update the allocation state of said bit map, to reflect that said un-allocated page found in the search procedure has been allocated to said central processor.

9. A method of determining the allocation state of n, where n is an integer, pages in a memory, said method comprising the steps of:

changing the state of each of n bits in a bit map to reflect the allocation state of an associated page in said memory with a given bit being in a first state when allocated and a second state when un-allocated;

performing a first search procedure of said bit map by a first processor to determine an un-allocated page in said memory;

performing a second search procedure, different than said first search procedure, of said bit map by a second processor to determine an un-allocated page in said memory; and providing the location of an un-allocated page in said memory by the first one of said first and second processors finding a bit in said bit map being in said second state, which reflects its associated page in said memory being un-allocated.

10. A method of determining the allocation state of pages in a n×m, where n and m arE integers, page memory operative with a central processor, with a bit map which includes n×m bits, with the state of each bit being indicative of whether or not an associated page in said memory is allocated or un-allocated, with a given bit being in a first state when its associated page in said memory is un-allocated, and being in a second state when its associated page in said memory is allocated, said method comprising the steps of:

performing by a first processor, a first search procedure for bits in said first state, optimized for a bit map densely populated with bits in said first state, of said bit map in response to a search request from said central processor to determine an un-allocated page performing by a second processor, a second bit map search procedure for bits in said first state, optimized for a bit map sparsely populated with bits in said first state, of said bit map in response to said search request from said central processor to determine an un-allocated page in said memory; and informing said central processor of the location of an un-allocated page in said memory by the first one of said first and second processors finding a bit in said bit map in said first state.

11. The method of claim 10, including the step of:

interrupting the search procedure of the one of said first and second processors that failed to find an un-allocated page in said memory, in response to said first one of said first and second processors finding a bit in said bit map in said first state; and updating the allocation state of said bit map by the one of said first and second processors that failed to find an un-allocated page in said memory, to reflect that the un-allocated page found in the search proceeding has been allocated to said central processor.

* * * * *